United States Patent [19]

Mülhaupt et al.

[11] Patent Number: 5,073,601
[45] Date of Patent: Dec. 17, 1991

[54] COMPOSITION OF BUTADIENE/POLAR COMONOMER COPOLYMER, AROMATIC REACTIVE END GROUP-CONTAINING PREPOLYMER AND EPOXY RESIN

[75] Inventors: Rolf Mülhaupt; Werner Rüfenacht, both of Marly, Switzerland

[73] Assignee: Ciba-Geigy Corporation, Ardsley, N.Y.

[21] Appl. No.: 384,958

[22] Filed: Jul. 25, 1989

[30] Foreign Application Priority Data

Jul. 28, 1988 [CH] Switzerland .......................... 2869/88

[51] Int. Cl.⁵ .......................... C08L 9/02; C08L 63/02; C08L 71/02
[52] U.S. Cl. .......................... 525/109; 525/65; 525/92; 525/111; 525/113; 525/524; 525/528; 525/529; 525/530; 525/531
[58] Field of Search .................. 525/528, 131, 65, 66, 525/92, 93, 94, 107, 109, 451, 454, 455, 502, 530, 531, 91, 529, 111, 113

[56] References Cited

U.S. PATENT DOCUMENTS

| | | | |
|---|---|---|---|
| 3,943,096 | 3/1976 | Schwarzenbach | 524/925 |
| 3,944,594 | 3/1976 | Kleiner et al. | 260/473 S |
| 4,602,071 | 7/1986 | Wellner et al. | 525/528 |
| 4,609,691 | 9/1986 | Geist et al. | 523/415 |
| 4,680,076 | 7/1987 | Bard | 525/529 |
| 4,820,789 | 4/1989 | Gonzalez et al. | 528/55 |

FOREIGN PATENT DOCUMENTS

| | | |
|---|---|---|
| 0247476 | 12/1987 | European Pat. Off. . |
| 0247483 | 12/1987 | European Pat. Off. . |
| 1222076 | 8/1966 | Fed. Rep. of Germany . |
| 2910020 | 9/1979 | Fed. Rep. of Germany ...... 525/524 |
| 1017612 | 1/1966 | United Kingdom . |

OTHER PUBLICATIONS

Org. Coat. Plast. Chem., vol. 40, pp. 899-902.

Primary Examiner—Melvyn I. Marquis
Attorney, Agent, or Firm—JoAnn Villamizar

[57] ABSTRACT

The invention relates to compositions containing A) a liquid copolymer based on butadiene and at least one polar, ethylenically unsaturated comonomer, and B) a polyether prepolymer capped with hydroxyarylcarboxylic or hydroxyaralkylcarboxylic acids, or a capped polyester, polythioester or polyamide containing polyether segments. The phenolic hydroxyl group in component B) can also be etherified with epichlorohydrin and this product can be converted to an episulfide, if desired, or the phenolic hydroxyl group can be reacted with cyanogen halide to form a cyanate group.

The stock compositions can be used in combination with epoxy resins to manufacture structural adhesives or sealing compounds.

18 Claims, No Drawings

COMPOSITION OF BUTADIENE/POLAR COMONOMER COPOLYMER, AROMATIC REACTIVE END GROUP-CONTAINING PREPOLYMER AND EPOXY RESIN

The present invention relates to novel flexibilizer combinations for epoxy resins, to compositions containing these combinations and epoxy resins, to novel components of the said combinations, to the cured products of the modified epoxy resins and to the use of the said combinations for flexibilizing epoxy resins.

It is known from U.S. Pat. No. 3,944,594 that esters of sterically hindered phenols with oligomeric glycols or thioglycols can be used for stabilizing organic polymers, inter alia polydienes, against oxidative degradation. As stabilizers, these compounds are normally used only in small amounts.

It is also known that epoxy resins can be modified by the addition of copolymers based on butadiene and acrylonitrile or by the addition of adducts of such copolymers and epoxy resins.

It is known from DE-A-3,331,903 that polyphenols with an elasticizing action, such as the esterification product of a higher-molecular diol with a hydroxyphenylcarboxylic acid, can be used for the preparation of water-dispersible binders for cationic electrophoretic enamels.

The effect of such additives is generally to increase the impact strength and flexibility of the cured product. The peel strength, however, generally leaves something to be desired. The incorporation of such polymers normally reduces the lap shear strength and lowers the glass transition temperature.

Combinations of impact strength modifiers have now been found which, when mixed with epoxy resins, effect a significant increase in the peel strength, have a reduced tendency towards crack propagation and permit high peel strengths without loss of lap shear strength.

Furthermore, depending on the resin formulation, these modifiers make it possible to produce elastic products of high peel strength and low glass transition temperature or high-strength products of high glass transition temperature and high peel strength; the high-strength products are distinguished by high fracture toughness and the crack propagation, even under very high shock-like impact stress, is markedly reduced.

The impact strength modifiers of the invention can be used with epoxy resins to prepare low-viscosity formulations, which is advantageous at the processing stage.

The cured epoxy resins are also distinguished by a good temperature resistance.

The present invention relates to compositions comprising

A) a liquid copolymer based on butadiene and at least one polar, ethylenically unsaturated comonomer, and B) a compound of formula I:

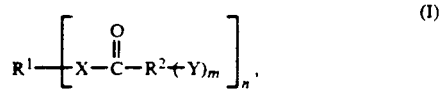

wherein m is 1 or 2, n is 2 to 6, X is —O—, —S— or —NR³—, Y is a radical selected from the group comprising —OH, —NHR³, —OCN,

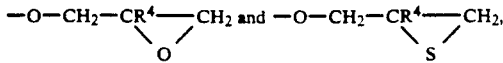

$R^1$ is a radical of a polyether prepolymer with hydroxyl, mercapto or amino end groups or of a segmented polyester, polythioester or polyamide prepolymer with hydroxyl, mercapto or amino end groups, containing at least 30 mol%, based on the said segmented prepolymer, of polyether segments after removal of the terminal functional groups, $R^2$ is a carbocyclic aromatic or araliphatic radical of valency m+1 with groups Y bonded direct to the aromatic ring, $R^3$ is hydrogen, $C_1$-$C_6$-alkyl or phenyl and $R^4$ is methyl or, in particular, hydrogen.

Component A) is a selected liquid elastomeric copolymer based on butadiene and preferably contains end groups which react with epoxy resins.

The molecular weight of these copolymers is preferably 500–5000, in particular 1000–3000.

This component can be used as such or as an adduct with an epoxy resin, preferably with a diglycidyl ether based on a bisphenol.

The term "liquid copolymer" will be understood in the context of the present description as meaning a compound which is free-flowing at temperatures below 80° C. and can easily be mixed with an epoxy resin.

Examples of polar, ethylenically unsaturated comonomers for the preparation of component A) are (meth)acrylic acid, (meth)acrylic acid esters, for example the methyl or ethyl esters, (meth)acrylamide, fumaric acid, itaconic acid, maleic acid or esters or half-esters thereof, for example the monomethyl or dimethyl esters, maleic or itaconic anhydride, vinyl esters, for example vinyl acetate, polar styrenes, for example ring-chlorinated or ring-brominated styrenes, or, in particular, acrylonitrile or methacrylonitrile.

In addition to polar, ethylenically unsaturated comonomers, component A) can also contain non-polar, ethylenically unsaturated comonomers, examples being ethylene, propylene or, in particular, styrene or substituted styrenes such as vinyltoluene.

Component A) can be a random copolymer, block copolymer or graft copolymer.

The proportion of comonomers in component A) can vary within wide limits. This component is chosen so that an elastomeric phase is formed in combination with component B) and, if appropriate, an epoxy resin C). An elastomeric phase of this type is normally characterized by a glass transition temperature below 0° C. The system in question can be homogeneous or heterogeneous.

An elastomeric phase may already be present in component A); alternatively the elastomeric phase may only be formed by selecting suitable components A), B) and, if appropriate, C).

If it is desired to have heterogeneous systems, the components are normally chosen so that the difference between the solubility parameters of A) and/or B) and those of C) is between 0.2 and 1.0, preferably between 0.2 and 0.6. These selection criteria are described for example by C. B. Bucknall in "Toughened Plastics", chapter 2, Applied Science Publishers Ltd., London 1977.

Especially preferred components A) are liquid butadiene/acrylonitrile copolymers.

Other most preferred components A) are liquid butadiene/acrylonitrile copolymers containing functional groups which react with epoxy resins, for example carboxyl, hydroxyl or amino groups.

Examples of such copolymers are acrylonitrile/butadiene rubbers containing carboxyl, hydroxyl or amino groups, for example compounds of the Hycar ® type from Goodrich.

Preferred types of such rubbers contain the structural units of the following formulae IIa to IId and the end groups G:

$$-CH_2-CH=CH-CH_2-, \quad (IIa)$$

$$-CH_2-CH-, \atop \underset{CH_2}{\overset{CH}{\|}} \quad (IIb)$$

$$-CH_2-CH-, \atop \underset{CN}{|} \quad (IIc)$$

$$-CH_2-\underset{R^b}{\overset{R^a}{\underset{|}{C}}}-, \quad (IId)$$

wherein $R^a$ is hydrogen or methyl, $R^b$ is —COOH, —COOR$^c$—COOR$^c$ or —CONH$_2$, $R^c$ is an aliphatic radical, preferably methyl, and G is selected from the group comprising —R—COOH, —R—OH,

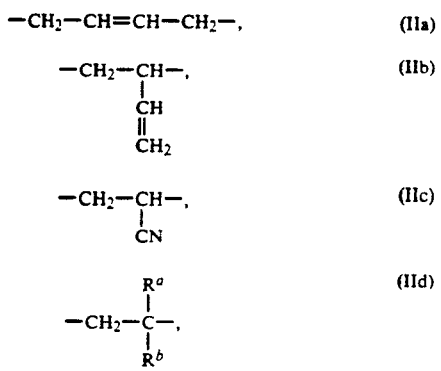

wherein R is an alkylene radical; the proportion of radicals IIa, IIb and IIc is preferably 5–50% by weight and the proportion of radical IId is preferably 0–30% by weight or, in the case of radicals having free carboxyl groups, preferably 0–10% by weight, the amounts being based on the total amount of radicals IIa, IIb, IIc and, if appropriate, IId.

Component A) is preferably used as the adduct of a butadiene/acrylonitrile copolymer containing functional groups which react with epoxy resins, and an epoxy resin. Such adducts are prepared in a manner known per se by heating the reactive butadiene/acrylonitrile rubber and the epoxy resin, if necessary with a catalyst, to form a fusible but still curable precondensation product. Examples of catalysts used are triphenylphosphine, tertiary amines, quaternary ammonium or phosphonium salts or chromium acetylacetonate.

Component B) is derived from polyether or polyester, polythioester or polyamide prepolymers with hydroxyl, mercapto or amino end groups and containing a minimum proportion, as defined above, of polyether segments, the end groups of which are modified as described below. Such prepolymers are known per se.

The molecular weight of such prepolymers is normally in the range from 500 to 20,000 (number-average), preferably in the range from 500 to 3000.

The average functionality of these prepolymers is at least 2, preferably 2 to 3.

It is especially preferred to use polyether or segmented polyester, polythioester or polyamide prepolymers which yield water-insoluble compounds of formula I. These are understood in the context of the present description as meaning compounds which are soluble in water to the extent of less than 5% by weight, preferably less than 1% by weight, and which, when stored in water, only take up a small amount of water, preferably less than 5% by weight, or exhibit only slight swelling.

The polyether or segmented polyester, polythioester or polyamide prepolymers can in some cases contain grafter 1-olefins, it being possible for the said 1-olefins to contain polar groups, such as nitrile, ester or amide groups, in addition to non-polar groups.

$R^1$ is preferably a polyalkylene glycol radical, in particular a polypropylene glycol or polybutylene glycol radical, with hydroxy, mercapto or amino end groups, after removal of the functional groups.

Polyalkylene glycols with hydroxyl end groups can be obtained for example by the anionic polymerization, copolymerization or block copolymerization of alkylene oxides, such as ethylene oxide, propylene oxide or butylene oxide, with difunctional or polyfunctional alcohols, such as butane-1,4-diol, 1,1,1-trimethylolethane, 1,1,1-trimethylolpropane, hexane-1,2,6-triol, glycerol, pentaerythritol or sorbitol, or with amines, such as methylamine, ethylenediamine or 1,6-hexylenediamine, as starter components, or by the cationic polymerization or copolymerization of cyclic ethers, such as tetrahydrofuran, propylene oxide or ethylene oxide, with acid catalysts, such as BF$_3$ etherate, or by the polycondensation of glycols which can undergo polycondensation with the elimination of water, such as hexane-1,6-diol, in the presence of acid etherification catalysts, such as p-toluenesulfonic acid.

It is also possible to use alkoxylation products of phosphoric acid or phosphorous acid with ethylene oxide, propylene oxide, butylene oxide or styrene oxide.

Polyalkylene glycols with amino end groups are derived for example from the polyalkylene glycols with hydroxyl end groups described above, such compounds containing primary hydroxyl groups, for example polybutylene glycol, being reacted with acrylonitrile and the products then being hydrogenated, or such compounds containing secondary hydroxyl groups being reacted with ammonia. Suitable polypropylene glycols with amino end groups are the compounds commercially available from Texaco under the name "Jeffamines ®".

Polyalkylene glycols with mercapto end groups can be prepared in a manner known per se from the corresponding polyalkylene glycols with hydroxyl or amino end groups, for example by the addition of mercaptocarboxylic acids or esters thereof, such as mercaptoacetic acid (esters), onto polyalkylene glycols with hydroxyl or amino end groups, or by the addition of episulfides onto polyalkylene glycols with hydroxyl or amino end groups.

The preferred radicals $R^1$ derived from the polyalkylene glycol derivatives listed above include the structural units of formulae IIIa, IIIb, IIIc, IIId and IIIe:

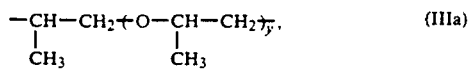

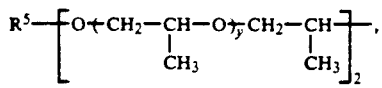 (IIIb)

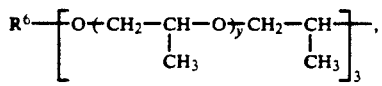 (IIIc)

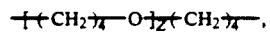 (IIId)

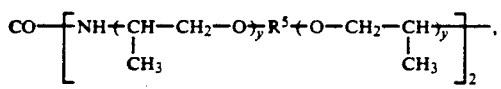 (IIIe)

wherein y is 5 to 90, in particular 10 to 90, Z is 10 to 40, $R^5$ is a radical of an aliphatic diol after removal of the two OH groups, and $R^6$ is a radical of an aliphatic triol after removal of the three OH groups.

Other preferred polyalkylene glycol prepolymers with hydroxyl, mercapto or amino end groups contain grafter 1-olefins, in particular styrene or acrylic acid derivatives such as acrylic acid esters or acrylonitrile.

The polyesters, polythioesters or polyamides with hydroxyl, mercapto or amino end groups and segmented with polyether radicals are normally derived from polyesters based on aliphatic, cycloaliphatic or aromatic polycarboxylic acids, in particular dicarboxylic acids, and on aliphatic or cycloaliphatic polyols or thioalcohols, in particular diols or triols, or on alilphatic or cycloaliphatic polyamines, in particular diamines or triamines; alternatively they are derived from lactones or lactams into which at least 30 mol%, based on the prepolymer component, of polyether segments has been introduced by condensation.

Examples of aliphatic polycarboxylic acids are oxalic acid, succinic acid, glutaric acid, adipic acid, pimelic acid, suberic acid, azelaic acid, sebacic acid or dimerized or trimerized linoleic acid, examples of cycloaliphatic polycarboxylic acids are tetrahydrophthalic acid, 4-methyltetrahydrophthalic acid, hexahydrophthalic acid or 4-methylhexahydrophthalic acid; examples of aromatic polycarboxylic acids are phthalic acid, isophthalic acid or terephthalic acid.

Examples of polyols are ethylene-1,2-diol, propane-1,2-diol, propane-1,3-diol, butane-1,4-diol, pentane-1,5-diol, hexane-1,6-diol, octane-1,8-diol, decane-1,10-diol or dodecane-1,12-diol, di-, tri- and tetra-ethylene glycol, di-, tri- and tetra-propylene glycol, di-, tri- and tetra-butylene glycol, 2,2-dimethylpropane-1,3-diol, 1,1,1-trimethylolethane, 1,1,1-trimethylolpropane, glycerol, hexane-1,2,6-triol, pentaerythritol, sorbitol, 1,3- or 1,4-dihydroxycyclohexane, cyclohexane-1,4-dimethanol, bis(4-hydroxycyclohexyl)methane, 2,2-bis(4-hydroxy-cyclohexyl)propane or 1,1-bis(hydroxymethyl)cyclohex-3-ene.

Examples of thioalcohols are 1,2-dimercaptoethane or 1,3-dimercaptopropane.

Examples of polyamines are 1,2-diaminoethane, 1,3-diaminopropane, 1,4-diaminobutane, 1,5-diaminopentane, 1,6-diaminohexane, di-, tri- and tetra-1,2-diaminoethane, di-, tri- and tetra-1,3-diaminopropane, di-, tri- and tetra-1,4-diaminobutane, piperazine, 2,5-dimethylpiperazine, 1-amino-3-aminomethyl-3,5,5-trimethylcyclohexane, 1,4-diaminocyclohexane, 1,4-bis(aminomethylene)-cyclohexane and bis(4-aminocyclohexyl)-methane.

An example of a lactone is ε-caprolactone; an example of a lactam is ε-caprolactam.

The polyether segments which have to be present in the polyester, polythioester or polyamide prepolymers can be present either as the only alcohol or amine component in the prepolymers or in combinations with other alcohol or amine components in the prepolymer. Thus the prepolymers can be prepared by the condensation of polycarboxylic acids, polylactones or polylactams with polyether blocks containing hydroxyl, mercapto or amino end groups, or by the condensation of polycarboxylic acids and polyols or polyamines in combination with polyether blocks containing hydroxyl, mercapto or amino end groups.

Preferred polyether blocks are the polyalkylene glycols with hydroxyl, mercapto or amino end groups listed above.

The subscript n is preferably 2 or 3 and the subscript m is preferably 1.

X is preferably —O—, —S— or —NH—.
Y is preferably —OH, —HN$_2$, —OCN,

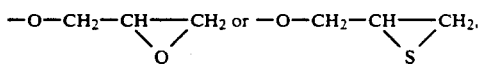

in particular —OH, —OCN,

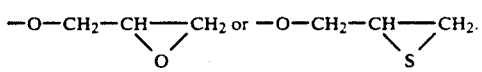

$R^2$ as a carbocyclic aromatic or araliphatic radical or valency m+1 with groups Y bonded direct to the aromatic ring is normally a mononuclear or polynuclear aromatic radical which can be unsubstituted or substituted by inert radicals. Polynuclear radicals can be fused or the rings can be linked to one another via direct C—C bonds or via bridging groups.

$R^2$ is preferably a divalent mononuclear or dinuclear aromatic radical or a divalent mononuclear araliphatic radical, in particular a radical of a hydroxybenzoic acid.

Examples of inert substituents are alkyl, alkenyl, alkynyl, alkoxy or halogen.

$R^2$ is preferably a radical of formula IVa, IVb or IVc:

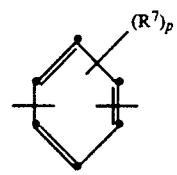 (IVa)

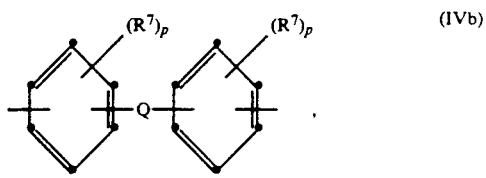 (IVb)

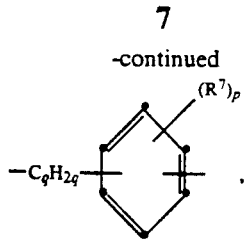
(IVc)

wherein $R^7$ is $C_1$-$C_6$-alkyl, $C_2$-$C_6$-alkenyl, $C_2$-$C_6$-alkynyl, $C_1$-$C_6$-alkoxy, halogen, in particular chlorine or bromine, or phenyl, p is an integer from 0 to 3, in particular 0 or 1, q is 1,2 or 3, in particular 1 or 2, and Q is a direct bond, —$C_qH_{2q}$—, in particular —$CH_2$— or —$C(CH_3)_2$—, or —O—, —S—, —$SO_2$—, —CO— or —$C(CF_3)_2$—.

In preferred compounds of formula I, m is 1, n is 2 or 3, $R^1$ is a radical of a polyalkylene glycol with hydroxyl, mercapto or amino end groups after removal of the functional groups, and $R^2$ is a radical of formula IVd, IVe, IVf or IVg:

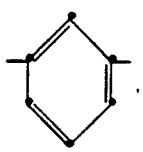
(IVd)

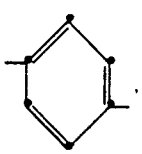
(IVe)

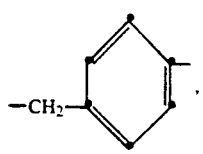
(IVf)

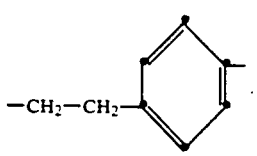
(IVg)

$R^3$ is preferably methyl or, in particular, hydrogen.

Any radicals as $C_1$-$C_6$-alkyl can be linear or branched radicals, linear radicals being preferred.

Specific examples of alkyl radicals are methyl, ethyl, n-propyl, isopropyl, n-butyl, isobutyl, n-pentyl or n-hexyl, methyl being preferred.

Any radicals as $C_1$-$C_6$-alkoxy can be linear or branched radicals, linear radicals being preferred.

Specific examples of alkoxy radicals are methoxy, ethoxy, n-propoxy, isopropoxy, n-butoxy, isobutoxy, n-pentoxy or n-hexyloxy, methoxy being preferred.

Any radicals as $C_2$-$C_6$-alkenyl are preferably linear radicals, for example vinyl, allyl, prop-1-enyl, but-1-enyl, pent-1-enyl or hex-1-enyl, vinyl and allyl being preferred.

Any radicals as $C_2$-$C_6$-alkynyl are preferably linear radicals, for example ethynyl, propargyl, but-1-ynyl, pent-1-ynyl or hex-1-ynyl, propargyl being preferred.

Any radicals as halogen are preferably chlorine or bromine.

The compounds of formula I can be obtained in a manner known per se by capping the hydroxyl, mercapto or amino end groups of the polyether prepolymers or of the segmented polyesters or polyamides with hydroxycarboxylic acids HOOC—$R^2$—$(OH)_m$ or aminocarboxylic acids HOOC—$R^2$—$(NHR^3)_m$, or ester derivatives thereof, in a molar amount essentially corresponding to the proportion of these end groups.

Examples of preferred hydroxybenzoic or aminocarboxylic acids (derivatives) are p-hydroxylbenzoic acid, p-aminobenzoic acid, salicylic acid and anthranilic acid, as sell as the methyl or ethyl esters thereof.

The polyester or polyamide resins of formula I can be prepared by general procedures applied to the preparation of such resins. Thus the esterification can advantageously be carried out by melt condensation of the carboxylic acid component(s) and the polyol or polyamine, the reactants being heated for example to a temperature of 240° C., with stirring. It is possible here to pass an inert gas, for example nitrogen, through the reaction mixture in order to remove the water formed during the reaction, or the alcohol in cases where an ester has been used as the functionalized carboxylic acid derivative. A further possibility is to apply a slight vacuum at the end of the esterification reaction, if necessary, in order to remove residual low-molecular cleavage products. The preferred temperature range for the melt condensation is 160°-200° C. The polycondensation can be carried out in the presence of a catalyst, if necessary, examples of catalysts being Sn(IV) compounds such as dibutyl-tin oxide or dibutyl-tin dilaurate.

However, it is also possible to use other forms of polycondensation, for example polycondensation in solution, in suspension or in bulk.

The anthranilamides can be prepared by reacting polyethers containing amino end groups or segmented polyamides containing amino end groups with isatoic anhydride.

The compounds of formula I in which Y is —OCN can be prepared starting from the compounds of formula I in which Y is —OH. This is done by reacting the polyesters or polyamides containing phenol end groups, of formula I, with cyanogen halide, in particular with cyanogen bromide, in the presence of a base, for example a tertiary amine such as triethylamine, in an inert aprotic solvent.

Examples of inert aprotic solvents are aromatic hydrocarbons such as toluene or xylene, or ketones such as methyl isobutyl ketone.

The reaction is normally carried out by mixing essentially equivalent amounts of compounds of formula I in which Y is —OH and cyanogen halide, with cooling, for example at 0° C., and by adding the tertiary amine at this temperature.

The compounds of formula I in which Y is

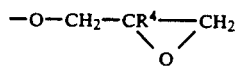

can be prepared starting from the compounds of formula I in which Y is —OH. This is done by reacting the polyesters or polyamides containing phenol end groups, of formula I, with epichlorohydrin or β-methylepichlorophydrin in the presence of a base, for example an alkali metal carbonate or alkali metal hydroxide, in an inert solvent. Examples of such solvents are listed above. The addition of epichlorohydrin or β-methylepichlorohydrin and the subsequent dehydrohalogenation can be carried out in one or two stages.

The reaction is normally carried out at elevated temperature, for example in the range from 60° to 120° C.

The analogous episulfides can be prepared in a manner known per se by reacting the epoxides of formula I described above with potassium thiocyanate or with thiourea.

The compounds of formula I normally have a molecular weight (number-average) of 600 to 20,000, in particular 800 to 5000.

The compounds of formula I in which Y is —OCN or

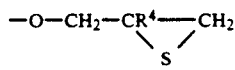

are novel and also represent a subject of the invention.

The compositions of the invention consisting of A) and B) can be processed with epoxy resins to give cured products having the advantageous properties described above.

The invention therefore further relates to compositions containing components A) and B), as defined above, and C) an epoxy resin with at least two 1,2-epoxy groups per molecule, or containing an adduct of component A) and an epoxy resin, component B) and, if appropriate, component C), or containing component A), an adduct of component B) and an epoxy resin, and, if appropriate, component C), or containing an adduct of component A) and an epoxy resin, an adduct of component B) and an epoxy resin, and, if appropriate, component C).

Combinations of component A) and an adduct of an epoxy resin C) and a compound of formula I in which Y is —OH are especially preferred. Adducts of component C) and component B) can be prepared analogously to the formation of adducts of reactive components A) and epoxy resins, described above.

The compositions of the invention can be prepared in conventional manner by mixing the components with the aid of known mixing units (stirrers, rolls).

In principle, any compound conventionally used in epoxy resin technology, including mixtures of several epoxy resins, can be used as component C).

Examples of epoxy resins are:

I) Polyglycidyl and poly(β-methylglycidyl) esters which can be obtained for example by reacting a compound containing at least two carboxyl groups in the molecule with epiclorohydrin, glycerol dichlorohydrin or β-methylepichlorohydrin in the presence of bases.

Examples of compounds with at least two carboxyl groups in the molecule are aliphatic polycarboxylic acids, cycloaliphatic polycarboxylic acids or aromatic polycarboxylic acids, as already mentioned above as components for the formation of polyesters or polyamides. Examples of tricarboxylic and higher carboxylic acids are, in particular, aromatic tricarboxylic or tetracarboxylic acids, such as trimellitic acid, trimesic acid, pyromellitic acid or benzophenonetetracarboxylic acid, and dimerized or trimerized fatty acids, for example those commercially available under the name Pripol ®, or copolymers of (meth)acrylic acid with copolymerizable vinyl monomers, for example the 1:1 copolymers of methacrylic acid with sytrene or with methyl methacrylate.

II) Polyglycidyl and poly(β-methylglycidyl) ethers which can be obtained for example by reacting a compound containing at least two alcoholic hydroxyl groups and/or phenolic hydroxyl groups in the molecule with epichlorohydrin, glycerol dichlorohydrin or β-methylepichlorohydrin under alkaline conditions or in the presence of an acid catalyst, and the treating the product with alkali.

Examples of compounds with at least two alcoholic hydroxyl groups and/or phenolic hydroxyl groups in the molecule are aliphatic or cycloaliphatic alcohols, such as those already mentioned above as components for the formation of polyesters, or alcohols containing aromatic groups, such as N,N-bis(2-hydroxyethyl)aniline or p,p'-bis(2-hydroxyethylamino)diphenylmethane, or mononuclear or polynuclear phenols, such as resorcinol, hydroquinone, bis(4-hydroxyphenyl)methane, 2,2-bis(4-hydroxyphenyl)propane, brominated 2,2-bis(4-hydroxyphenyl)propane, bis(4-hydroxyphenyl) ether, bis(4-hydroxyphenyl sulfone, 1,1,2,2-tetrakis(4-hydroxyphenyl)ethane or novolaks which can be obtained by condensing aldehydes, such as formaldehyde, acetaldehyde, chloral or furfuraldehyde, with unsubstituted, alkyl-substituted or halogen-substituted phenols, such as phenol, the bisphenols described above, 2- or 4-methylphenol, 4-tert-butylphenol, p-nonylphenol or 4-chlorophenol.

III) Poly(N-glycidyl) compounds which can be prepared for example by dehydrochlorinating reaction products of epichlorohydrin with amines which contain at least two amino hydrogen atoms.

Examples of amines on which such epoxy resins are based are aliphatic or cycloaliphatic amines, such as those mentioned above as components for the formation of polyamides, aromatic amines, such as aniline, p-toluidine, bis(4-aminophenyl)methane, bis(4-aminophenyl)-sulfone or bis(4-aminophenyl) ether, or araliphatic amines, such as m-xylylenediamine.

However, the poly(N-glycidyl) compounds also include triglycidyl isocyanurate, N,N'-diglycidyl derivatives of cycloalkyleneureas such as ethyleneurea or 1,3-propyleneurea, and N,N'-diglycidyl derivatives of hydantoins such as 5,5-dimethylhydantoin.

IV) Poly(S-glycidyl) compounds, for example di-S-glycidyl derivatives which are derived from dithiols, such as ethane-1,2-dithiol, or from bis(4-mercaptomethylphenyl) ether.

V) Cycloaliphatic epoxy resins or epoxidation products of dienes or polyenes, such as cycloaliphatic epoxy resins which can be prepared for example by epoxidizing ethylenically unsaturated cycloaliphatic compounds. Examples are 1,2-bis(2,3-epoxycyclopentoxy)ethane, 2,3-epoxycyclopentyl glycidyl ether, diglycidyl cyclohexane-1,2-dicarboxylate, 3,4-epoxycyclohexyl glycidyl ether, bis(2,3-epoxycyclopentyl) ether, bis(3,4-epoxycyclohexyl) ether, 5(6)-glycidyl-2-(1,2-epoxyethyl)bicyclo[2.2.1]heptane, dicyclopentadiene dioxide, cyclohexa-1,3-diene dioxide, 3,4-epoxy-6-methylcyclohexylmethyl-3',4'-epoxy-6'-methylcyclohexanecarboxylate or 3,4-epoxycyclohexylmethyl-3',4'-epoxycyclohexanecarboxylate.

It is also possible, however, to use epoxy resins in which the 1,2-epoxy groups are bonded to different heteroatoms or functional groups; such compounds include, for example, the N,N,O-triglycidyl derivative of 4-aminophenol, the glycidyl ether glycidyl ester of salicyclic acid, N-glycidyl-N'-(2-glycidyloxypropyl)-5,5-dimethylhydantoin or 2-glycidyloxy-1,3-bis(5,5-dimethyl-1-glycidylhydantoin-3-yl)propane.

Diglycidyl ethers based on bisphenol, in particular bisphenol A, are preferred.

The compositions of the invention normally contain additional hardeners D) known per se to those skilled in the art, if necessary in combination with an accelerator E).

Examples of hardeners D) are polyamines with at least two primary and/or secondary amino groups, such as aliphatic amines, for example propane-1,3-diamine, hexamethylenediamine, diethylenetriamine, triethylenetetramine or 2,2,4-trimethylhexane-1,6-diamine; cycloaliphatic amines, for example bis(4-aminocyclohexyl)methane or 3-aminomethyl-3,5,5-trimethylcyclohexylamine (isophoronediamine); aromatic amines, for example bis(4-aminophenyl)methane, aniline/formaldehyde resins, bis(4-aminophenyl) sulfone, bis(4-aminophenyl)methane or 2,2-bis(4-aminophenyl)propane; araliphatic amines, such as xylylenediamine; or heterocyclic amines.

Other examples of hardeners D) are polyaminoamides, for example those derived from aliphatic polyamines and dimerized or trimerized fatty acids; amides, including substituted ureas, in particular ureas with aromatic radicals, such as N-(4-chlorophenyl)-N,N'-dimethylurea, N-(3-chloro-4-methylphenyl)-N,N',-dimethylurea (chlortoluron), N-(2-hydroxyphenyl)-N,N'-dimethylurea or 2,4-bis(N,N-dimethylureido) toluene; polyphenols, such as resorcinol, hydroquinone, 2,2-bis(4-hydroxyphenyl)-propane (bisphnol A) and novolaks based on monophenols or polyphenols, such as phenol or cresols, and aldehydes, such as formaldehyde, acetaldehyde or chloral; polythiols, such as the polythiols commercially available under the name "Thiokols ®"; or polycarboxylic acids and in particular the anhydrides thereof, for example phthalic anhydride, tetrahydrophthalic anhydride, hexahydrophthalic anhydride, hexachloroendomethylenetetrahydrophthalic anhydride, pyromellitic anhydride, benzophenone-3,3',4,4'-tetracarboxylic dianhydride and the acids of the above-mentioned anhydrides, as well as isophthalic acid and terephthalic acid.

It is also possible to use hardeners having a catalytic action, such as tertiary amines, e.g. 2,4,6-tris(dimethylaminomethyl)phenol; Mannich based or imidazoles, such as 2-methylimidazole, 2-phenylimidazole, 2-ethyl-4-methylimidazole, 1-benzyl-2-methylimidazole or 1-cyanoethyl-2-methylimidazole; tin salts of alkanoic acids, for example tin octoate; or Friedel-Crafts catalysts, for example boron trifluoride and boron trichlordie and the complexes and chelates thereof which can be obtained by reacting boron trifluoride or boron trichloride with e.g. 1,3-diketones, amines or ethers.

Other suitable hardeners are amidines, for example dicyandiamide or 1-cyano-3-(lower alkyl)guanidines such as the 3-methyl, 3,3-dimethyl or 3,3-diethyl derivatives.

Examples of curing accelerators E) are tertiary amines, the salts thereof or quaternary ammonium compounds, such as benzyldimethylamine, 2,4,6-tris(dimethylaminomethyl)phenol, 4-aminopyridine or tetramethylammonium chloride; or the above-mentioned imidazoles or substituted ureas.

The properties of the cured end product can be varied according to the proportions of components A) and B).

The following percentages relate in each case to the total weight of components A), B) and C).

If it is desired to have products of high strength, high glass transition temperature, high peel strength, high impact strength and high resistance to crack propagation (cracking resistance), the proportions of components A) and B) should not normally exceed 60% by weight. Such systems are normally heterogeneous. The lower limit depends on the desired properties, for example the peel strength. Under normal circumstances, components A) and B) should account for more than 5% by weight, preferably more than 10% by weight.

If, on the other hand, it is desired to have products with the highest possible flexibility, components A) and B) should be present in proportions of at least 40% by weight, preferably more than 60% by weight.

If component A) and/or B) has been modified by the formation of an adduct with an epoxy resin, a separate component C) is not absolutely necessary.

The weight of A) to B) can be varied within wide limits. As regards the range of A) to B), 50:1 to 1:50 is preferred, 20:1 to 1:10 is especially preferred and 5:1 to 1:5 is most preferred.

The proportions of epoxy resin C) and of the total amount of A), B) and C) can also be varied within wide limits. For cured products of high flexibility, smaller amounts of C), for example 10 to 30% by weight, will generally by used, it also being possible for component C) to be present as an adduct with A), whereas for cured products of high strength, larger amounts of C), for example 50 to 95% by weight, preferably 60 to 80% by weight, will generally be used.

The compositions of the invention can be cured at low temperatures, for example at room temperature, or with the application of heat.

The curing temperatures in the case of hot curing are generally between 80° and 250° C., preferably between 100° and 180° C.

If desired, curing can also be carried out in two stages, e.g. by interrupting the curing process or, if using a hardener for higher temperatures, by allowing the curable mixture to cure partly at lower temperatures. The resulting products are precondensation products which are still fusible and soluble (so-called "B-stage resins") and are suitable e.g. for compression moulding compounds, sintering powders or prepregs.

Preferred systems are hot-curable systems in which components A), B) and C) are used in combination with primary and/or secondary aromatic amines or with amidines, in particular dicyandiamide, as hardeners D); accelerators, in particular urea-based accelerators, can be incorporated if necessary.

Component B) used in this embodiment is in particular a compound of formula I in which Y is —OH, —OCN,

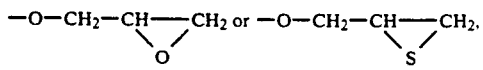

or an adduct of an epoxy resin C) and a compound of formula I where Y=—OH.

Compositions containing components A) and B) in which component B) contains compounds of formula I with Y=—NHR³ are preferably used for the manufacture of epoxy-based two-component adhesives which cure at room temperature. This is done by combining the composition containing components A) and B) with epoxy resin C) in a manner known per se, just before processing.

If desired, reactive diluents can be added to the curable mixtures in order to reduce the viscosity further, examples of such diluents being styrene oxide, butyl glycidyl ether, 2,2,4-trimethylpentyl glycidyl ether, phenyl glycidyl ether, cresyl glycidyl ether or glycidyl esters of synthetic, highly branched, mainly tertiary aliphatic monocarboxylic acids.

Other conventional additives which the mixtures of the invention can also contain are plasticizers, extenders, fillers and reinforcing agents, for example coal tar, bitumen, textile fibres, glass fibres, asbestos fibres, boron fibres, carbon fibres, mineral silicates, mica, quartz powder, hydrated aluminium oxide, bentonites, wollastonite, kaolin, silicic acid aerogel, metal powders, e.g. aluminium powder or iron powder, pigments and dyes, such as carbon black, oxide pigments and titanium dioxide, flameproofing agents, thixotropic agents, levelling agents (which can also be used in some cases as mould release agents), such as silicones, waxes and stearates, or adhesive primers, antioxidants and light stabilizers. When curing with phenols or aromatic amines, it is preferred to add temperature-resistant thermoplasts, in particular aromatic polyethers, such as poly(2,6-dimethylphenol), polyether-sulfones, polyether-imides or polyether-ketones.

The mixtures of the invention can be used quite generally for the manufacture of cured products and can be used in the formulation appropriate to the particular field of application for the manufacture of adhesives, self-adhesive films, patches, sealing compounds, varnishes or matrix resins.

The invention further relates to the use of the curable mixtures for the above-mentioned purposes and to the use of the compositions of components A) and B) as flexibilizers for epoxy resins.

The cured products are distinguished by the advantageous properties described in the introduction. The invention therefore further relates to the products obtainable by curing compositions containing A), B) and C) or containing adducts of A) and/or B) and epoxy resins.

The following Examples will serve to illustrate the invention. Amounts are given in parts by weight unless stated otherwise.

A) Preparation of the prepolymers

EXAMPLE 1

Under nitrogen, 270 g of ethyl p-hydroxybenzoate and 893 g of bis(3-aminopropyl)polytetrahydrofuran (Mn=1100) are heated at 220° C. for 8 hours in the presence of 4 g of dibutyl-tin oxide, ethanol being distilled off. Yield: 1056 g of a viscous resin giving the following analytical data:

viscosity (according to Epprecht): $\eta_{25}$=42,880 mPas;
phenol content: 1.38 val/kg;
molecular weight (GPC, in THF): Mn=1680; Mw/Mn=2.2.

EXAMPLE 2

Under nitrogen, 33.2 g of ethyl p-hydroxybenzoate and 210 g of bis(3-aminopropyl)polytetrahydrofuran (Mn=2100) are heated at 220° C. for 8 hours in the presence of 0.5 g of dibutyl-tin oxide, ethanol being distilled off. Yield: 226 g of a viscous resin giving the following analytical data:

viscosity (according to Epprecht): $\eta_{25}$=12,000 mPas;
phenol content: 0.72 val/kg;
molecular weight (GPC, in THF): Mn=2810; Mw/Mn=2.6.

EXAMPLE 3

Under nitrogen, 1000 g of polytetrahydrofuran with two hydroxyl end groups (Mn=1000) and 332 g of ethyl p-hydroxybenzoate are heated at 220° C. for 10 hours in the presence of 5 g of dibutyl-tin oxide, ethanol being distilled off. Yield: 1236 g of a viscous resin giving the following analytical data:

viscosity (according to Epprecht): $\eta_{25}$=6880 mPas;
phenol content: 1.54 val/kg;
molecular weight (GPC, in THF): Mn=1560; Mw/Mn=2.3.

EXAMPLE 4

Under nitrogen 110 g of bis(3-aminopropyl) polytetrahydrofuran (Mn=1000) and 32.6 g of isatoic anhydride are reacted at 120° C. for 6 hours. Yield: 127 g of a viscous resin giving the following analytical data:

viscosity (according to Epprecht): $\eta_{25}$=6320 mPas;
phenol content: 1.16 val/kg;
molecular weight (GPC, in THF): Mn=1600; Mw/Mn=2.1

EXAMPLE 5

Under nitrogen, 500 g of polypropylene glycol with two amino end groups (Mn=2000) and 83 g of ethyl p-hydroxybenzoate are heated at 220° C. for 6 hours in the presence of 2 g of dibutyl-tin oxide. Yield: 548 g of a viscous resin giving the following analytical data:

viscosity (according to Epprecht): $\eta_{25}$=2560 mPas;
phenol content: 0.73 val/kg.

EXAMPLE 6

Under nitrogen, 500 g of polypropylene glycol with three amino end groups (Mn=5000) and 50 g of ethyl p-hydroxybenzoate are heated at 210° C. for 6 hours in the presence of 2 g of dibutyl-tin oxide. Yield: 524 g of a viscous resin giving the following analytical data:

viscosity (according to Epprecht): $\eta_{25}$=3360 mPas;
phenol content: 0.44 val/kg.

EXAMPLE 7

Under nitrogen, 730 g of bisphenol A diglycidyl ether (epoxy content: 5.4 val/kg), 200 g of acrylonitrile-/butadiene copolymer with carboxyl end groups (acrylonitrile content: 26%, acid number: 32 mg of KOH/g), 64 g of bisphenol A and 5 g of triphenylphosphine are heated at 130° C. for 3 hours until a viscous resin with an epoxy content of 3.3 val/kg and an Epprecht viscosity of 130,000 mPas (40° C.) has formed.

EXAMPLE 8

A mixture of 150 g of the prepolymer according to Example 3 and 150 g of bisphenol A diglycidyl ether (epoxy content: 5.4 val/kg) is heated at 140° C. for 2 hours in the presence of 4.5 g of triphenylphosphine until a viscous resin giving the following analytical data has formed:

epoxy content: 1.8 val/kg;
viscosity (25° C.): 44,800 mPas.

EXAMPLE 9

A mixture of 500 g of the polytetrahydrofuran with two 4-hydroxybenzoate end groups according to Example 3, 214 g of dimethylformamide, 170 g of finely ground potassium carbonate and 275 g of epichlorohydrin is heated at 60° C. for 5 hours. The salt is then filtered off, the filtrate is concentrated on a rotary evaporator at 80° C. under vacuum, 1.5 l of diethyl ether are added and the mixture is washed with 500 ml of deionized water. After the ether phase has been dried over sodium sulfate, the solvent is stripped off under vacuum. Yield: 470 g of a viscous resin giving the following greased sandblasted aluminium of thickness 1.5 mm (Avional ®). The test pieces, with an overlap of 1.25 cm$^2$, are heated at 180° C. for 60 minutes in order to cure the mixtures described above. The lap shear strength (N/mm$^2$) is determined according to DIN 53283. In some cases, the T-peel is also determined on 0.8 mm degreased steel according to DIN 53282, with a curing time of one hour at 180° C. The results are given in the following Table:

TABLE

| Composition and test results for the adhesive mixtures studied | | | | | | | | | | | | | | |
|---|---|---|---|---|---|---|---|---|---|---|---|---|---|---|
| | Example no. | | | | | | | | | | | | | |
| | I | II | III | IV | V | VI | VII | VIII | IX | X | XI | XII | XIII | XIV |
| Diglycidyl ether based on bisphenol A (epoxy content 5.4 val/kg) | 35 | 35 | 35 | 35 | 35 | 35 | 35 | 35 | 35 | 35 | — | 35 | 35 | 35 |
| Butanediol diglycidyl ether (epoxy content 9.2 val/kg) | 2,5 | 2,5 | 2,5 | 2,5 | 2,5 | 2,5 | 2,5 | 10 | 10 | 10 | — | 2,5 | 2,5 | 2,5 |
| Wollastonite Pl | 15 | 15 | 15 | 15 | 15 | 15 | 15 | 15 | — | — | — | 15 | 15 | 15 |
| Pyrogenic silicic acid | 3,5 | 3,5 | 3,5 | 3,5 | 3,5 | 3,5 | 3,5 | 3,5 | 2 | 2 | 2 | 3,5 | 3,5 | 3,5 |
| Dicyandiamide | 4,9 | 4,9 | 4,9 | 4,9 | 4,9 | 4,9 | 4,9 | 4,9 | 4,8 | 4,8 | 4,8 | 4,9 | 4,9 | 4,9 |
| Chlortoluron | 0,25 | 0,25 | 0,25 | 0,25 | 0,25 | 0,25 | 0,25 | 0,25 | 1,0 | 1,0 | 1,0 | 0,25 | 0,25 | 0,25 |
| Prepolymer of Example 7 | 15 | 15 | 15 | 15 | 15 | 15 | 30 | 7,5 | 15 | 30 | 30 | 15 | 15 | 15 |
| Prepolymer of Example no. | 1 | 2 | 3 | 4 | 5 | 6 | 8 | 3 | 3 | 3 | 9 | 10 | 11 | |
| (g) | 15 | 15 | 15 | 15 | 15 | 15 | 15 | 7,5 | 15 | 30 | 30 | 15 | 15 | 15 |
| lap shear strength on aluminium (N/mm$^2$) | 39,0 | 35,0 | 33,7 | 33,7 | 35,0 | 26,7 | 38,7 | 35,4 | 32,4 | 25,5 | 6,3 | 34,8 | 33,0 | 28,9 |
| lap shear strength on steel (N/mm$^2$) | 29,9 | 28,3 | 25,1 | 27,4 | 27,8 | 20,3 | 27,9 | n.d. | n.d. | n.d. | n.d. | 26,2 | 28,0 | 27,3 |
| T peel on steel (N/mm ) | 3,1 | 4,0 | 5,4 | 5,9 | 4,7 | 3,0 | 4,0 | n.d. | n.d. | n.d. | n.d. | 3,7 | 5,2 | 4,5 | n.d. not determined analytical data:
viscosity (according to Epprecht): $\eta_{25} = 4320$ mPas;
epoxy content: 0.95 eq/kg;
molecular weight (GPC, in THF): Mn = 1480; Mw/Mn = 3.6.

EXAMPLE 10

93.2 g of triethylamine in 500 ml of toluene are added at 0° C., over 30 minutes, to a mixture of 500 g of the polytetrahydrofuran with two 4-hydroxybenzoate end groups according to Example 3 and 66 g of cyanogen bromide in 1 l of toluene and the resulting mixture is stirred at 0° C. for a further 3 hours. It is then filtered and the organic phase is washed with 750 ml of water. After drying over sodium sulfate, the solvent is removed on a rotary evaporator at 60°-70° C. under vacuum. Yield: 440 g of a viscous resin giving the following analytical data:
viscosity (according to Epprecht): $\eta_{25} = 8960$ mPas;
molecular weight (GPC, in THF): Mn = 1210; Mw/Mn = 9.7.

EXAMPLE 11

A mixture of 1 kg of polytetrahydrofuran with two hydroxyl end groups (Mn = 1000) and 330 g of ethyl p-aminobenzoate is heated at 220° C. for 8 hours in the presence of 4 g of dibutyl-tin oxide, ethanol being distilled off. 1250 g of a viscous resin giving the following analytical data are isolated:
viscosity (according to Epprecht): $\eta_{25} = 6080$ mPas;
amine content: 1.4 eq/kg;
molecular weight (GPC, in THF): Mn = 1500; Mw/Mn = 3.6.

B) Application Examples

Study of the cured mixtures

The mixtures described in the Table below are prepared on a three-roll mill and used for bonding de-

What is claimed is:
1. A composition comprising
   A) a liquid copolymer based on butadiene and at least one polar, ethylenically unsaturated comonomer;
   B) a prepolymer of formula I:

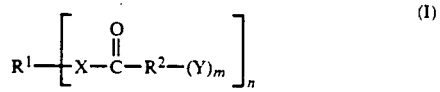

wherein m is 1 or 2, n is 2 to 6, X is —O—, —S— or —NR$^3$—, Y is a radical selected from the group consisting of —OH, —NHR$^3$, —OH reacted with a cyanogen halide to introduce —OCN, —OH reacted with an epichlorohydrin to introduce

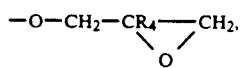

and —OH reacted with an epichlorohydrin to introduce an epoxide which is reacted with potassium thiocyanate or thiourea to introduce

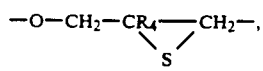

R$^1$ is a radical of a polyether, prepolymer with hydroxyl mercapto or amino end groups or of a segmented polyester, polythioester or polyamide prepolymer with hydroxyl, mercapto or amino end groups, containing at least +mol%, based on said segmented prepolymer, of polyether segments after removal of the functional end groups, R$^2$ is a carbocyclic aromatic or araliphatic radical of valency m+1 with groups Y bonded directly to the aromatic ring, $R^3$ is hydrogen, $C_1$-$C_6$-alkyl or phenyl and $R^4$ is methyl or hydrogen;

C) an epoxy resin with at least two 1,2-epoxy groups per molecule; and

D) an effective amount of a hardener based on an aromatic polyamine with at least two primary or secondary amino groups or an aromatic polyamine with at least two primary and secondary amino groups or an amidine.

2. A composition according to claim 1 further containing an accelerator.

3. A composition according to claim 1 selected from the group consisting of a composition containing components A), B), C) and said hardener; a composition containing an adduct of component A) and an epoxy resin, component B), component C) and said hardener, a composition containing component A), an adduct of compound B) and an epoxy resin component C) and said hardener; and a composition containing an adduct of component A), an adduct of component B), component C) and said hardener.

4. A composition according to claim 1, wherein component A) is a liquid butadiene/acrylonitrile copolymer.

5. A composition according to claim 1, wherein component A) is an adduct of a butadiene/acrylonitrile copolymer containing functional groups which react with epoxy resins, and an epoxy resin.

6. A composition according to claim 1, in which $R^1$ is a polyalkylene glycol radical with hydroxyl, mercapto or amino end groups, after removal of the functional groups.

7. A composition according to claim 6, in which the polyalkylene glycol radical is a polypropylene glycol or a polybutylene glycol radical.

8. A composition according to claim 1, in which n is 2 or 3 and m is 1.

9. A composition according to claim 1, in which X is —O—, —S— or —NH—.

10. A composition according to claim 1, in which Y is —NH₂——OH, —OCN,

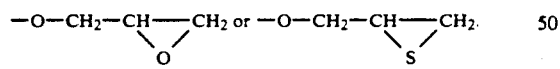

11. A composition according to claim 10, in which Y is —OH, —OCN,

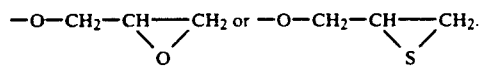

12. A composition according to claim 1, in which Y is —OH.

13. A composition according to claim 1, in which $R^2$ is a radical of formula IVa, IVb or

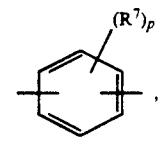   (IVa)

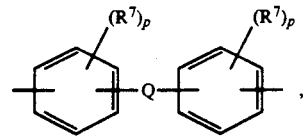   (IVb)

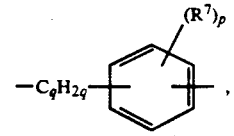   (IVc)

wherein $R^7$ is $C_1$-$C_6$-alkyl, $C_2$-$C_6$-alkenyl, $C_2$-$C_6$-alkynyl, $C_1$-$C_6$ -alkoxy, halogen or phenyl, p is an integer from 0 to 3, q is 1,2 or 3 and Q is a direct bond, —$C_qH_{2q}$—, —O—, —S—, —SO₂—, —CO — or —C(CF₃)₂.

14. A composition according to claim 13 in which p is 0 or 1, q is 1 or 2 and Q is —CH₂— or —C(CH₃)₂—.

15. A composition according to claim 1 in which m is 1, n is 2 or 3, $R^1$ is a radical of a polyalkylene glycol with hydroxyl, mercapto or amino end groups, after removal of the functional groups, and $R^2$ is a radial formula IVd, IVe, IVf or IVg;

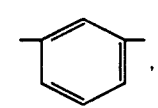   (IVd)

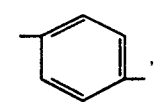   (IVe)

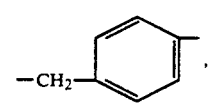   (IVf)

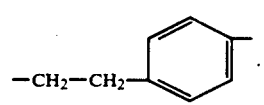   (IVg)

16. A compound of formula I according to claim 1 in which Y is —OCN or

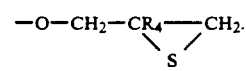

17. A composition according to claim 2 in which the hardener is dicyandiamide and the accelerator is a urea-based accelerator.

18. A cured product obtained by heating a composition according to claim 1 in order to cure it.

* * * * *